Patented May 8, 1951

2,552,326

UNITED STATES PATENT OFFICE 2,552,326

PROCESS FOR PRODUCING TETRAETHYL PYROPHOSPHATE

Gennady M. Kosolapoff, Dayton, Ohio, assignor to Monsanto Chemical Company, St. Louis, Mo., a corporation of Delaware No Drawing. Application August 28, 1947, Serial No. 771,155

5 Claims. (Cl. 260—461)

In my copending application filed April 25, 1947, Serial No. 744,036, now Patent No. 2,486,658, patented November 1, 1949, I have disclosed and claimed a process for the production of esters of polyphosphoric acids by the reaction of a dialkyl chlorophosphate and trialkylphosphate. The therein disclosed process may be employed for the production of tetraethyl pyrophosphate, in which case the reaction is believed to proceed according to the following equation:

(1) $(C_2H_5O)_2POCl + (C_2H_5O)_3P=O \rightarrow$
$(C_2H_5O)_4P_2O_3 + C_2H_5Cl$ The mixture of diethyl chlorophosphate and triethyl phosphate employed in the above indicated reaction may be prepared by the direct reaction of ethyl alcohol with phosphorus oxychloride as follows:

(2) $5C_2H_5OH + 2POCl_3 \rightarrow$
$(C_2H_5O)_3PO + (C_2H_5O)_2POCl + 5HCl$

This reaction yields a mixture of triethyl phosphate and diethyl chlorophosphate in the proper proportions suitable for further reaction according to Equation 1 above.

From a consideration of the above, it will be obvious that these reactions may be combined under suitable conditions and a combination process carried out which proceeds according to the following reaction:

(3) $5C_2H_5OH + 2POCl_3 \rightarrow$
$(C_2H_5O)_4P_2O_3 + 5HCl + C_2H_5Cl$

From a practical standpoint, it is desirable to mix together the alcohol and the POCl₃ at a temperature below 25° C. and preferably below 10° C. If desired, the reaction may be carried out in a solvent. The temperature is maintained below the above upper limits until the HCl initially formed in the reaction has been substantially completely evolved from the mixture. The procedure which I prefer to follow is carried out as follows:

Five mols of ethyl alcohol are gradually added to two mols of POCl₃ with efficient stirring, the temperature being maintained below 25° C. and preferably below 10° C. Hydrogen chloride is formed in the reaction and may be substantially completely removed by subjecting the mixture to a vacuum or by evaporation of a portion of the solvent present (if one is employed). The mixture should not be heated above about 25° C. and preferably not above 10° C., while any substantial quantities of hydrogen chloride remain in the mixture.

Upon heating the so-formed mixture of trialkyl phosphate and diethyl chlorophosphate to within the range of from 130° C. to 150° C., until reaction has been completed, a good yield of tetraethyl pyrophosphate is obtained according to the process illustrated by reaction (1) above.

In view of the favorable effect of excess quantities of triethyl phosphate upon the polyphosphate formation reaction, it is desirable to increase the concentration of the said triethyl phosphate in the mixture undergoing reaction. This may conveniently be accomplished by the use of substantially larger quantities of alcohol. Thus, when the reaction is carried out utilizing 8 mols of ethyl alcohol and 3 mols of POCl₃ a mixture is obtained (after the evolution of hydrogen chloride) which consists of about 2 mols of triethyl phosphate and one mol of diethyl chlorophosphate.

Upon heating the so-formed mixture of trialkylphosphate and dialkyl chlorophosphate to within the range of from 130° C. to 150° C., until ethyl chloride evolution has ceased, a considerably improved yield of tetraethyl pyrophosphate is obtained. The reaction mixture produced in this case consists of a substantially increased quantity of tetraethyl pyrophosphate and triethyl phosphate. If desired, the triethyl phosphate may be separated from the tetraethyl pyrophosphate by distillation. In most cases, however, the mixture may be used for insecticidal purposes without separation of the constituents thereof.

When tetraethyl pyrophosphate is produced by the present process either in the crude form, that is, without distillation of the product, or in the distilled form, the product exhibits excellent insecticidal activity. When employed as an insecticide upon such insects as aphids, red spiders or citrus mites, the product is from 5 to 10 times as potent as is hexaethyl tetraphosphate when employed upon the same insects. In spite of the high order of insecticidal activity, I have now found that the activity of the product can be increased by at least 50% or more by the application of the present invention.

It is, accordingly, an object of the present invention to provide a process for producing tetraethyl pyrophosphate which comprises reacting together ethyl alcohol and POCl₃ in proportions such that the mixture undergoing reaction contains at least 5 mols of ethyl alcohol per each 2 mols of POCl₃. The mixture is treated as above in order to remove substantially completely the hydrogen chloride formed and thereafter it is heated to a temperature sufficiently high so that ethyl chloride is formed and volatilized from the mixture. The temperature at which ethyl chloride is formed is above 130° C. and may be as high as 150° C. Under these conditions a good yield of tetraethyl pyrophosphate is obtained. If the original reactants (ethyl alcohol and POCl₃) have been employed in proportions greater than that indicated by reaction (3) above, the final product will contain a correspondingly large amount of triethyl phosphate.

According to my discovery the crude product is now washed at a temperature not above 25° C. with an aqueous solution of an alkali or alkaline earth carbonate. Washing is done quickly in order to obviate a small amount of hydrolysis which may take place and the product is then separated from the aqueous washing solution. The separation by which the organic layer is recovered should also be rapidly completed in order to prevent or restrict hydrolysis. In general, I have found that the operation of washing and separating may be carried out in a tower and should be completed within a period of 10 minutes and preferably within 5 minutes.

The treatment with alkaline solutions of crude tetraethyl pyrophosphate mixture is best carried out after said crude mixture has been dissolved in an organic aromatic solvent. Solvents suitable for this purpose comprise benzene, toluene, chlorobenzene, ethylbenzene, xylene, etc.

The alkali or alkaline earth carbonates which may be utilized comprise any of the following: Sodium carbonate, potassium carbonate, calcium carbonate or magnesium carbonate, etc. Those carbonates which are insoluble in water may be suspended in aqueous solution and have been found to be effective when so employed.

The volume of aqueous alkaline reagent employed for washing the organic aromatic solution should be not substantially in excess of an equal volume of aqueous solution. Preferably the volume of aqueous solution may be restricted to one-half the volume of organic liquid. The temperature of washing should be maintained at least below 25° C. and preferably between 0° C. and 25° C.

*Example 1*

Five and one-third gram mols of ethyl alcohol and two mols of phosphorus oxychloride were mixed together at a temperature between 0 and 10° C. at 100–150 mm. The mixture was then heated to 120° at 150–40 mm. until evolution of ethyl chloride ceased. A small amount of triethyl phosphate was removed by distillation. The product assayed by biological methods showed a potency equivalent to 44% of pure tetraethyl pyrophosphate.

The above product was then dissolved in benzene in the proportions of 164 grams of crude tetraethyl pyrophosphate in 500 cc. of benzene. This solution was washed with 200 grams of saturated sodium carbonate solution, maintained at 0° C. The aqueous solution was then separated, benzene was removed by vacuum distillation. Bioassay of the resulting product showed a potency equivalent to 66.6% of pure tetraethyl pyrophosphate.

*Example 2*

One gram mol of diethyl chlorophosphate was mixed with 1.5 gram mols of triethyl phosphate and then while stirring the mixture was heated to 135° C. for a period of four hours. During the heating period ethyl chloride was evolved. Upon distillation of the product 142 grams of triethyl phosphate was recovered. The residue is crude tetraethyl pyrophosphate. The crude product is dissolved in 250 cc. of xylene. This solution is now cooled to 5° C. and then shaken with 150 cc. of water containing in suspension 50 grams of finely powdered calcium carbonate, while at a temperature of 5° C. The time of exposure of the product to water was under 10 minutes. The aqueous suspension is then separated from the organic layer. The latter is then diluted with additional xylene to such an extent that a solution of xylene containing 1% of tetraethyl pyrophosphate is obtained. The xylene solution may be used directly as an insecticidal spray, it may be further diluted, or it may be added to water to form an emulsion and employed in this form. The product exhibited greatly increased potency as compared with a similar product which had not been washed with calcium carbonate suspension.

While I do not understand the reactions involved in the herein disclosed invention and accordingly do not wish to be bound by any theory of operation, it appears from observation that I have made that the insecticidal potency of tetraethyl pyrophosphate is greatly enhanced and the chemical stability is likewise increased by the herein disclosed treatment with alkali or alkaline earth metal carbonates. As will be clear from the above examples, the process may be applied either to the product as produced by the reaction between ethyl alcohol and phosphorus oxychloride, or it may be applied to the product as produced by the reaction of triethyl phosphate and diethyl chlorophosphate. It may likewise be applied to the crude reaction product or to the product which has been purified by distillation.

What I claim is:

1. In a process for producing tetraethyl pyrophosphate by the reaction of 5 moles of ethanol with 2 moles of phosphoryl chloride, wherein the initial reaction resulting in the formation of HCl and subsequent substantially complete removal thereof from the reaction mixture is carried out at a temperature below 25° C., followed by a subsequent treatment at a temperature of from 130° C. to 150° C. resulting in the formation and volatilization of ethyl chloride from the reaction mixture, the step of treating, at a temperature below 25° C., the resulting product, while dissolved in an organic aromatic liquid, with an aqueous solution of a carbonate selected from the group consisting of alkali metal carbonates.

2. In a process for producing tetraethyl pyrophosphate by the reaction of 5 moles of ethanol with 2 moles of phosphoryl chloride, wherein HCl is formed together with a mixture of diethyl chlorophosphate and triethyl phosphate, and wherein said HCl is substantially completely removed from the reaction mixture, following which said reaction mixture is raised to a temperature between 130° C. and 150° C. whereby formation and volatilization of ethyl chloride occurs, the step of treating, at a temperature below 25° C., the resulting product while dissolved in an organic aromatic liquid, with an aqueous solution of a carbonate selected from the group consisting of alkali metal carbonates and alkaline earth metal carbonates.

3. In the process for producing tetraethyl pyrophosphate by the reaction of diethyl chlorophosphate and triethyl phosphate by heating at a temperature of from 130° C. to 150° C., whereby ethyl chloride is formed and volatilized, the step of treating at a temperature below 25° C. the resulting product in an aromatic solvent with an aqueous solution of a carbonate selected from the group consisting of alkali metal carbonates and alkaline earth metal carbonates.

4. In a process for producing tetraethyl pyrophosphate by the reaction of 5 moles of ethanol with 2 moles of phosphoryl chloride wherein the initial reaction resulting in the formation of HCl and subsequent substantially complete removal thereof from the reaction mixture is carried out at a temperature below 10° C. followed by a subsequent treatment at a temperature of from 130° C. to 150° C. resulting in the formation and volatilization of ethyl chloride from the reaction mixture, the step of treating at a temperature below 25° C. the resulting product in an aromatic solvent with an aqueous solution of a carbonate selected from the group consisting of alkali metal carbonates and alkaline earth metal carbonates.

5. In a process for producing tetraethyl pyrophosphate by reacting in solution in an aromatic solvent 5 moles of ethanol with 2 moles of phosphoryl chloride, wherein the initial reaction resulting in the formation of HCl and subsequent substantially complete removal thereof, from said solvent is carried out at a temperature below 10° C., followed by a subsequent treatment at a temperature of from 130° C. to 150° C. resulting in the formation and volatilization of ethyl chloride from the reaction mixture, the step of treating at a temperature below 25° C. the resulting product in an aromatic solvent with an aqueous solution of a carbonate selected from the group consisting of alkali metal carbonates and alkaline earth metal carbonates.

GENNADY M. KOSOLAPOFF.

REFERENCES CITED

The following references are of record in the file of this patent:

Clermont, "Annalen der Chemie," vol. 91 (1854), pp. 375–376.

Cavalier, "Comptes rendus," vol. 142 (1906), pp. 885 to 887.

Rosenheim et al., "Ber. deutsch. chem. Ges.," vol. 41 (1908), pp. 2708 to 2711.

Balarew, "Zeit. anorg. allgem. Chemie," vol. 99 (1917), page 191.

Hall et al., "Ind. and Eng. Chem.," vol. 40 (April 1948), pp. 694–699.